March 20, 1956 — H. BURG — 2,738,776
FURNACE BURNERS
Filed Feb. 8, 1952 — 2 Sheets-Sheet 1
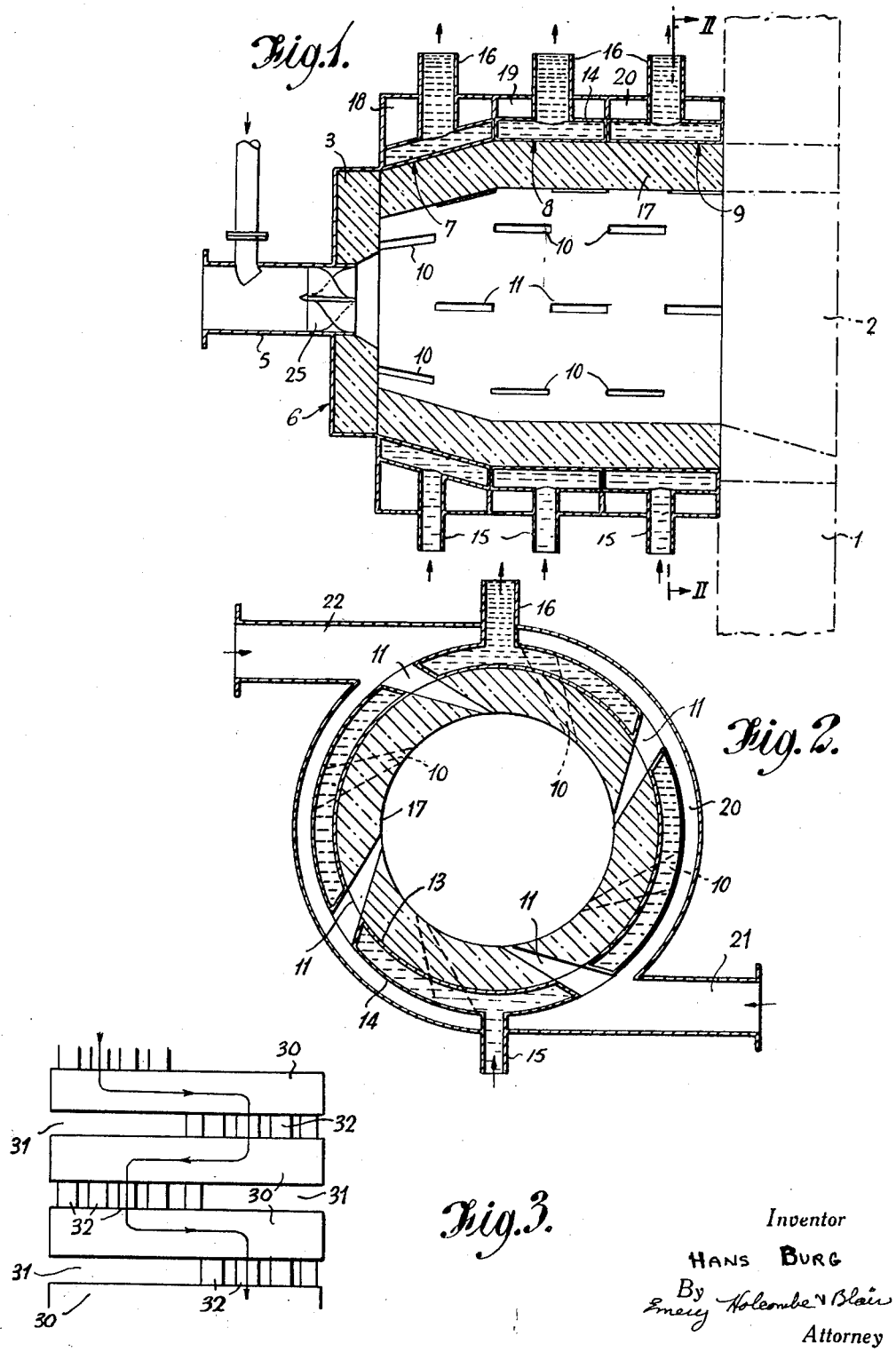
Inventor
HANS BURG
By Emery Holcombe & Blair
Attorney March 20, 1956  H. BURG  2,738,776
FURNACE BURNERS Filed Feb. 8, 1952  2 Sheets-Sheet 2

Inventor
Hans Burg

By
Emery, Holcombe & Blair
Attorneys

United States Patent Office 2,738,776
Patented Mar. 20, 1956

2,738,776
FURNACE BURNERS

Hans Burg, Essen, Germany, assignor of one-half to Pollopas Patents Limited, London, England, a British company Application February 8, 1952, Serial No. 270,669

Claims priority, application Great Britain June 13, 1951

12 Claims. (Cl. 122—6.6)

The present invention relates to furnace burners of the kind, hereinafter called fuel-injection type furnace burner in which the fuel, for example pulverised fuel, gas, oil or other fuels and fuel mixtures, is injected into a combustion chamber of which the wall is provided with apertures for the admission of secondary combustion means, such as air or gas, the apertures being directed at an acute angle to the tangent to the internal surface of the combustion chamber so as to produce a rotating sleeve of secondary gas around the burner flame to assist in the complete combustion of the burner fuel. Generally the burner orifice through which the fuel is injected into the combustion chamber is also provided with means for imparting a rotary motion to the fuel in the same direction of rotation as the sleeve. Furnace burners of this type are described, for example, in the specification of my co-pending application Serial No. 270,667 filed February 8, 1952. In furnace burners of this type, extraordinarily high temperatures are produced in the combustion chamber, and the present invention has for one of its objects to provide an arrangement for cooling the walls of the combustion chamber.

According to one aspect of the present invention the combustion chamber of a furnace burner of the kind above referred to is provided over the external surface of the refractory wall or lining of the combustion chamber with a hollow box-like metal jacket, constructed in one or more parts, through which a cooling fluid can be circulated, wherein apertures or gaps are provided in or between the parts of the jacket corresponding in position with the outer ends of the inlet apertures for secondary gas in the refractory wall or lining.

The invention also consists in a furnace burner of the kind above referred to, in which the combustion chamber is constituted by a hollow box-like metal jacket, which is constructed in one or more parts, and is formed with apertures or gaps for the admission of secondary gas arranged in staggered relationship (in the longitudinal direction of the combustion chamber), in or between the parts of the jacket, said jacket being lined on its inner surface with a refractory material in which apertures are also provided in alignment with the apertures or gaps in the jackets, whereby secondary gas may be admitted to the combustion chamber from the exterior of the jacket.

In the case where the combustion chamber is of cylindrical form, the cooling jacket may be constituted by a double-walled jacket of annular form, or by a plurality of such annular jackets arranged end-to-end, the internal surface of the jacket or jackets being lined with a refractory material, for example refractory bricks, chromium ore or the like. The, or each, jacket is provided with inlet apertures for secondary gas distributed around the periphery thereof, these apertures preferably being in the form of slots extending parallel to the axis of the combustion chamber for a distance less than the axial length of a jacket. Preferably the slots are staggered so that the cooling fluid is directed axially back and forth in the jacket as it circulates therearound. The refractory lining may be secured to the internal surface of the cooling jacket, for example by means of studs or other convenient means, and is formed with apertures in alignment with the apertures in the cooling jacket and directed at an acute angle to the tangent to the internal surface of the combustion chamber.

In a modification, each box-like jacket may be constructed of a number of individual hollow boxes arranged with gaps therebetween and extending parallel to the axis of the combustion chamber, the individual boxes being interconnected by tubes or the like which are preferably disposed, in succeeding gaps, alternately at opposite ends of the jacket, the parts of the gaps that are free from such tubes constituting staggered gaps for the admission of secondary gas. The refractory lining is arranged to cover the internal surface of the individual boxes and the tube connections.

Water may be circulated through the cooling jacket which may form a preheater for the boiler feed water. Any other cooling medium, either liquid or gas, may alternatively be used.

Other objects and aspects of the invention will become apparent from the following description of embodiments with reference to the accompanying drawings in which:

Fig. 1 shows a longitudinal section through the furnace burner according to the present invention.

Fig. 2 shows a section along the line II—II in Fig. 1.

Fig. 3 shows a developed scrap view of a modified construction of the cooling jacket.

Figure 4:
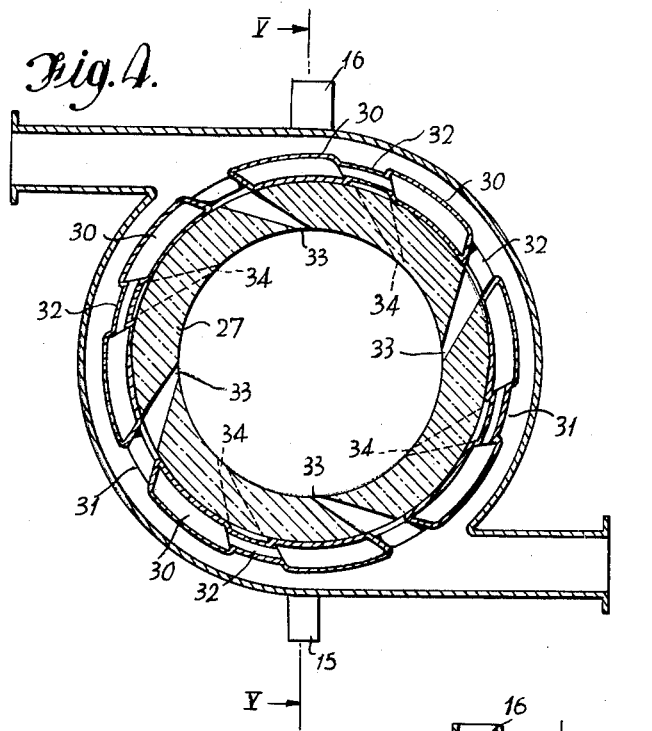
Fig. 4 is a cross-section on line IV—IV of Fig. 5, of a burner incorporating said modified construction.

Referring to Figs. 1 and 2 of the drawing, 1 is the wall of a furnace, for example a steam boiler, over an aperture 2 in which is co-axially fitted one end of the combustion chamber 6. Into the opposite end of the combustion chamber is fitted a burner tube 5 through which primary air and pulverised fuel can be injected into the combustion chamber, means, such as helical vanes 25, being provided in the burner orifice to impart a rotary motion to the injected fuel-air mixture. The burner orifice is located in an end plate 3, lined with refractory material, which closes one end of the combustion chamber 6. The combustion chamber is constructed of three axially joining sections 7, 8 and 9. Each of these sections comprises an annular water jacket comprising inner and outer walls 13 and 14 and having inlet and outlet connections 15 and 16 for passing cooling water through the jacket. Each jacket is formed with two sets of slots 10, 11 extending inwardly from opposite ends of the jacket for approximately one half the length of the jacket and in staggered relationship as shown in the drawings. The internal surfaces of the three water jackets are lined with a refractory lining 17, which may be secured thereto by studs (not shown) or in any other convenient way, the lining also being formed with apertures corresponding in position to the apertures in the water jackets. These apertures in the water jackets and lining are, as shown in Fig. 2, of tapering width from outside to inside and also inclined at an angle of about 30° to the tangent to the internal surface of the combustion chamber at the point where the aperture is positioned, so that secondary air admitted therethrough will be directed tangentially to the core of the flame and produce a sleeve of secondary air around the flame and rotating in the same direction as the flame. Surrounding the water jackets are chambers 18, 19 and 20 to which secondary air is admitted through pipes 21, 22, the amount of air admitted to each of the chambers being controlled by suitable control valves (not shown).

Figure 5:
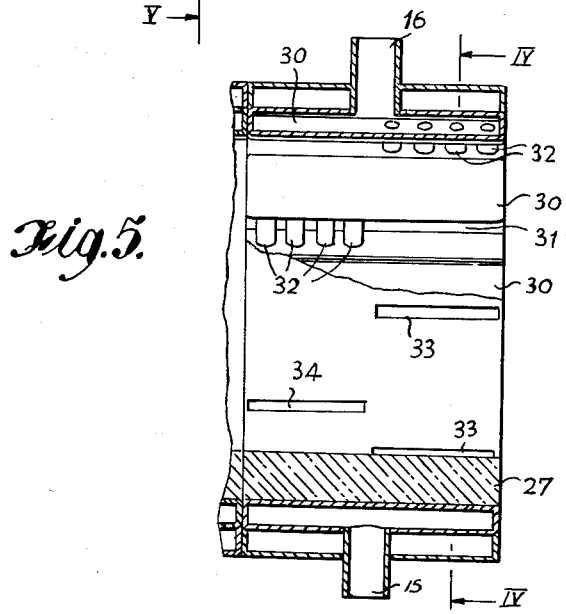
Fig. 5 is a longitudinal section, similar to that of Fig. 1 of part of this modified burner, with part of the lining broken away.

In the modification shown in Figs. 3 to 5, the water jacket instead of being constructed in the form of a sleeve with slots formed therein, is constructed from a plurality of individual hollow boxes 30, each box extending longitudinally of the combustion chamber, and said plurality of boxes being arranged around the periphery of the combustion chamber with gaps 31 therebetween which correspond to the slots of Figs. 1 and 2, the boxes being interconnected alternately at opposite ends by tubular studs 32 extending across the gaps 31, the assembly being curved to the shape of the combustion chamber to form the complete water jacket, through which the water circulates along the path indicated by the arrow in Fig. 3. The internal surface of the water jacket assembly is provided with a lining 27 of refractory material which covers the boxes and the tubular studs and is formed with inlet apertures 33, 34 for secondary air in alignment with the portions of the gaps 31 where the studs 32 are not fitted.

I claim:

1. For a tubular combustion chamber having a heat-insulating peripheral wall, a cooling jacket constituted by at least one annular array of box-like jacket elements which each extend in the axial direction of said array and are spaced peripherally thereof to form longitudinal gaps therebetween, said elements being interconnected by hollow studs extending across said gaps at longitudinally staggered positions.

2. A furnace burner comprising a tubular combustion chamber having a peripheral wall and one end wall formed with an aperture therein, said chamber being open at the end opposite to said end wall, a burner tube for the admission into the combustion chamber of a flowable fuel and primary combustion air, said tube having a burner orifice directing said fuel and primary air into the chamber through said aperture in a direction approximately axially of said chamber, said peripheral wall including a plurality of annular cooling jackets placed end to end along the length of the chamber, each jacket being constituted by walls enclosing a continuous jacket chamber through which cooling liquid can be circulated and being formed with passages extending radially through said jacket chamber, said peripheral wall also including a heat-insulating refractory sleeve covering the inner circumferential surface of all said annular jackets and being arranged in direct contact with said surface, said refractory sleeve being formed with air inlets extending therethrough and communicating respectively with the individual said apertures in said jackets.

3. For a furnace burner, the combination comprising a heat-insulated combustion chamber of approximately circular cross-section having a peripheral heat-insulating refractory layer provided with inlet apertures for the admission of combustion-supporting gas and an end wall provided with a fuel-admission aperture, said inlet apertures being directed at an acute angle to the tangent to the internal surface of the combustion-chamber wall, a hollow metal jacket surrounding said heat-insulating refractory layer, said jacket having an inner wall in contact with said layer and an outer wall spaced from said inner wall and defining with said inner wall a cavity, and said hollow jacket being formed with gas admission passages separate from the interior cavity of said jacket, said gas admission passages corresponding in position with, and leading into said inlet apertures, means for admitting cooling fluid into said jacket, and means for permitting heated cooling fluid to leave said jacket.

4. A combustion chamber arrangement as claimed in claim 3, wherein the inlet apertures are arranged in a plurality of annular rows spaced in the longitudinal direction of the combustion chamber, the apertures in consecutive annular rows being relatively staggered.

5. A combustion chamber arrangement as claimed in claim 3, in which the jacket is formed in a plurality of parts which are separated peripherally of the chamber by gaps extending longitudinally of the chamber, at least part of said gas-admission passages being constituted by such gaps.

6. A combustion chamber arrangement as claimed in claim 3, further comprising supplementary structure outside said jacket forming at least one gas admission chamber in contact with the outer side of said jacket and in communication with said gas admission apertures.

7. A combustion chamber as claimed in claim 3, for a fuel-injection type burner, in which said metal jacket comprises a plurality of coaxially aligned annular metal part-length jackets arranged end to end, each part-length jacket comprising a sleeve-like inner wall and a sleeve-like outer wall surrounding the inner wall and joined to the latter at both ends to form a hollow part-length jacket, at least some of said part-length jackets being formed with longitudinal slots constituting said gas admission passages, said heat-insulating refractory layer, covering the inner sides of all said part-length jackets with its inlet apertures in substantial respective alignment with said slots, and pipe means for conducting said cooling fluid through all said hollow jackets.

8. A heat-insulated combustion chamber as claimed in claim 3, in which the jacket comprises a first metal sleeve forming said inner wall and lined on its inner surface with said heat-insulating refractory layer to form the peripheral wall of the combustion chamber, a second metal sleeve surrounding said first sleeve to form said outer wall and joined to said inner wall to form therewith said hollow metal jacket, said metal jacket and layer being formed with said aligned passages extending therethrough for the admission of said combustion-supporting gas into the combustion chamber from the exterior of the jacket, and passage walls extending between said first and second sleeve to separate said passages from the hollow interior of said jacket.

9. A combustion chamber arrangement as claimed in claim 8, having a plurality of annular rows of passages, said rows being mutually displaced in the longitudinal direction of the combustion chamber, and the passages in consecutive annular rows being staggered peripherally.

10. A combustion chamber arrangement as claimed in claim 8, wherein said gas-admission passages provided in the jacket are in the form of a plurality of axially spaced annular rows of slots, each slot extending parallel to the axis of the combustion chamber for a distance less than the axial length of the jacket, and the slots in consecutive annular rows being staggered circumferentially of the chamber.

11. A combustion chamber for a furnace burner, comprising an end wall provided with a fuel admission opening and a peripheral wall including a plurality of longitudinally disposed hollow members peripherally spaced to form a jacket having longitudinal gaps therein, conduit means extending across said gaps for connecting adjacent members of said jacket, said conduit means being restricted to part of the length of each gap, and the conduit means being staggered in alternate gaps of the jacket, a heat-insulating body of refractory material covering the inner side of said members and said conduit means, said body being formed with admission passages for combustion-supporting gas in alignment with said gaps outside said part of the length of each gap to which said conduit means are restricted.

12. In a tubular combustion chamber a cooling jacket having a heat-insulating peripheral wall comprising a plurality of hollow metal boxes arranged in approximately parallel relation around the combustion chamber, in contact with said wall and in spaced relation to each other, and sets of connection tubes interconnecting each said box, adjacent opposite ends thereof, respectively with each of the two boxes next adjacent to it.

(References on following page)

References Cited in the file of this patent

UNITED STATES PATENTS

| | | |
|---|---|---|
| 290,927 | Rew | Dec. 25, 1883 |
| 756,382 | Lester | Apr. 5, 1904 |
| 1,617,694 | Schwartz | Feb. 15, 1927 |
| 1,618,808 | Burg | Feb. 22, 1927 |
| 1,795,347 | Reese | Mar. 10, 1931 |
| 1,918,397 | Jezler | July 18, 1933 |
| 1,926,637 | Suffern | Sept. 12, 1933 |
| 1,946,011 | Burg | Feb. 6, 1934 |

FOREIGN PATENTS

| | | |
|---|---|---|
| 470,189 | Germany | Jan. 7, 1929 |